United States Patent [19]

House

[11] 4,444,998
[45] Apr. 24, 1984

[54] TOUCH CONTROLLED MEMBRANE FOR MULTI AXIS VOLTAGE SELECTION

[75] Inventor: V. Dean House, Orem, Utah

[73] Assignee: Spectra-Symbol Corporation, Salt Lake City, Utah

[21] Appl. No.: 315,374

[22] Filed: Oct. 27, 1981

[51] Int. Cl.³ ............................................. G08C 21/00
[52] U.S. Cl. ...................................... 178/19; 338/114
[58] Field of Search ........................... 178/19, 18, 20; 338/114, 205

[56] References Cited

U.S. PATENT DOCUMENTS

| | | | |
|---|---|---|---|
| 2,866,124 | 12/1958 | Giuffrida et al. | 338/90 |
| 2,900,446 | 8/1959 | McLaughlin et al. | 178/18 |
| 2,902,607 | 9/1959 | Hedger et al. | 323/354 |
| 2,907,824 | 10/1959 | Peek | 338/90 |
| 2,973,140 | 2/1961 | Katz | 338/90 |
| 3,063,018 | 11/1962 | Gordon et al. | 328/147 |
| 3,178,566 | 4/1965 | Harpell | 338/90 |
| 3,290,495 | 12/1966 | Malmros | 338/90 |
| 3,358,151 | 12/1967 | Haase | 307/15 |
| 3,440,522 | 4/1969 | Kruse | 338/119 |
| 3,551,820 | 12/1970 | Bagwell | 325/465 |
| 3,624,583 | 11/1971 | Nakada | 338/69 |
| 3,624,584 | 11/1971 | Ohno | 338/69 |
| 3,626,350 | 12/1971 | Suzuki et al. | 338/69 |
| 3,668,313 | 6/1972 | Dym | 178/19 |
| 3,699,492 | 10/1972 | Yoshihara | 338/69 |
| 3,783,392 | 1/1974 | Drake et al. | 328/127 |
| 3,789,391 | 1/1974 | Brock et al. | 340/347 SY |
| 3,895,288 | 7/1975 | Lampen et al. | 323/94 R |
| 3,911,215 | 10/1975 | Hurst | 178/18 |
| 3,927,593 | 12/1975 | Kawamura | 338/69 |
| 3,952,156 | 4/1976 | Lahr | 338/90 |
| 3,968,467 | 7/1976 | Lampen et al. | 338/119 |
| 3,982,219 | 9/1976 | Rehak | 338/96 |
| 4,014,217 | 3/1977 | Lagasse et al. | 338/114 |
| 4,070,544 | 1/1978 | Lambden | 178/18 |
| 4,128,209 | 12/1978 | Johnson | 239/583 |
| 4,137,517 | 1/1979 | Garcea | 338/118 |
| 4,178,481 | 12/1979 | Kley | 178/18 |
| 4,203,088 | 5/1980 | Sado et al. | 338/69 |
| 4,235,141 | 11/1980 | Eventoff | 338/69 |
| 4,268,815 | 5/1981 | Eventoff et al. | 338/69 |

OTHER PUBLICATIONS

C. P. Ludeman; Keyboard Employing Voltage Distribution Matrix Position Sensor; Dec. 1974, vol. 17, No. 7, IBM Technical Disclosure Bulletin, pp. 2015-2016.

Primary Examiner—Stafford D. Schreyer
Attorney, Agent, or Firm—H. Ross Workman; Rick D. Nydegger; Berne S. Broadbent

[57] ABSTRACT

A touch controlled membrane device producing an output signal which is a function of any dual coordinate location resulting from an applied pressure in a two dimensional resistive field. In one preferred embodiment a single resistive film is spaced from a coextensive conductive film. First and second source voltages are alternately applied across orthogonal axis directions of the resistive film to establish voltage gradients in both directions. Pressure applied to the conductive film brings the conductive and resistive films into contact so that a unique two component output signal appears on the conductive film which defines the X and Y coordinates of the location of the applied pressure. In a second embodiment, two resistive films are mounted opposite to two conductive surfaces applied onto opposite sides of an insulative film, and voltage is applied to the resistive films in orthogonally related directions. Pressure applied to one resistive film causes both resistive films to contact the conductive surfaces so that the voltages applied to each conductive surface represent the coordinates of the point of contact.

10 Claims, 7 Drawing Figures

TOUCH CONTROLLED MEMBRANE FOR MULTI AXIS VOLTAGE SELECTION

BACKGROUND

1. Technical Field of the Invention

The present invention relates to potentiometers designed to provide voltage selection over a continuous range of voltages. More particularly, the present invention relates to a touch controlled membrane device which provides voltage selection over a continuous range of voltages simultaneously in two or more axis directions of a multi-dimensional field.

2. The Prior Art

Potentiometers for controlling voltage selection are used in numerous types of applications in both home and industry. For example, these devices may be used in the control panels of such things as aircraft and aerospace applications, large construction equipment, computers, lighting systems, arcade games, or kitchen appliances, to name just a few.

In the past the prior art potentiometers for providing voltage selection have typically been of three types. One type provides a manually operated mechanical wiper that is typically controlled by a knob or slider on a control panel. The wiper is always in contact with a resistive element, which provides for voltage selection over a continuous range of voltages. The constant mechanical contact between the wiper and resistive element tends to accelerate the wear and eventual destruction of this type of potentiometer.

A second, more recent type of potentiometer provides an elongated resistive element and an elongated wiper that is parallel to and spaced from the resistive element. See, for example, U.S. Pat. Nos. 3,624,584 and 3,699,492. In this type of potentiometer the elongated wiper is not in constant contact with the resistive element and is used to achieve voltage selection by depressing the wiper at selected locations along its length to bring it into contact with the resistive element, which has a voltage applied to it. Although this type of device reduces wear, it is not possible to produce a continuous range of output voltage levels because the wiper in this type of prior art device is typically segmented. Thus there is some sacrifice in the ability to accurately control voltage selection, which makes the device less versatile.

Recently there has been devised yet another type of potentiometer. See, for example, see U.S. Pat. Nos. 3,895,288 and 3,968,467. This type of device typically includes a continuous length of electrically resistive material, a corresponding continuous length of electrically conductive material which serves as the wiper, and an electrically insulating spacer which serves to simultaneously support and separate the resistive and conductive materials. Either one or both of the resistive and conductive materials are designed as a flexible membrane so that they can be pressed together at any selected location along their length to bring them into electrical contact with each other.

If a voltage is applied across the resistive material a voltage gradient is established along the length of the material. The voltage gradient may be a linear or nonlinear function of the material's length depending upon the particular composition of resistive material used. Thus, touching either the top or bottom surface of the flexible membrane will cause the resistive and conductive materials to contact each other, producing a voltage output on the conductive material or wiper. The advantage of this device is that it minimizes wiper contact and reduces wear and yet provides a continuous range of output voltage levels, since the conductive wiper is not segmented.

However, this device, like the other types of prior art potentiometers described above, is limited to a single axis or one dimensional output. And while the single dimensional type prior art potentiometers are extremely practical in applications where it is desirable to provide a voltage representing displacement along a single axis, there are many applications requiring that a control signal represent a discrete position in a two dimensional field. For example, control signals identifying specific locations on a two dimensional field are commonly used in computer graphics, television screens or to remotely control the position of various kinds of antennas or other objects in two dimensions.

One device known in the art which produces a two dimensional or dual axis output is described in U.S. Pat. No. 4,014,217 to Lagasse et al. That device uses a layer of compressible material having an electrical conductivity that varies in accordance with the state of compression of the layer. A matrix of electrodes is distributed on one side of the layer so as to sense current density variations in the layer. By properly comparing the signals produced by the individual electrodes it is possible to determine the approximate point of contact on the layer's surface. While this device provides multiple discrete voltage signals for identifying contact location, it does not provide a single voltage signal which varies continuously as a function of changes in the two dimensional location of contact. Thus, it is relatively complicated in its structure and operation and can define only an approximate position.

A similar type of device used to provide a two dimensional output is described in U.S. Pat. No. 3,440,522 to Kruse. The primary embodiment disclosed in that patent establishes a two dimensional voltage gradient across an area by dividing the area into four quadrants and applying X and Y source voltage levels at multiple peripheral source locations along a circular path surrounding the area. The polarity of each applied X and Y voltage is determined by the quadrant in which the source location is disposed; the magnitude of each applied voltage depends upon the angular position of the source location within the quadrant. Each point in the gradient area has a unique voltage level which can be transferred to a conductive sheet by forcing the sheet into contact with the gradient area at the selected point. This device requires multiple voltage sources or voltage dropping resistors and requires precise circular placement of the source locations in order to establish the desired two dimensional voltage gradient. As a consequence this device is very expensive to manufacture and cannot be used for rectangular field configurations.

Other embodiments described in the Kruse patent utilize numerous separate conductors which are arranged in opposite surfaces so that the location of contact between the surfaces is identified by voltage levels traceable to particular conductors. Thus, only discrete locations corresponding to points of conductor contact may be derived from those embodiments.

In light of the above, it would be an improvement in the art to provide a touch controlled device for providing output voltage selection over a continuous range of voltages simultaneously in two or more axes of a multi-dimensional field such that the output voltage may be representative of any position on that field. It would be a further improvement to provide such a device which utilizes a small number of component parts and is simple and inexpensive to manufacture.

BRIEF SUMMARY AND OBJECTS OF THE INVENTION

The present invention comprises a touch controlled device capable of simultaneously producing output voltage signals which represent any point of contact along multiple axis directions in a field of two or more dimensions. The invention utilizes a minimum number of circuit components in combination with a touch controlled resistive membrane having a unique configuration that can be easily manufactured.

In one preferred embodiment of the present invention, two different voltages are applied to orthogonal edges of a single resistive film. The two voltages may comprise, for example, alternate half cycles of an alternating supply voltage. A conductive surface on a flexible membrane is positioned so as to face the resistive film in close proximity thereto. By applying pressure to the flexible membrane the conductive surface may be made to contact the resistive film, whereupon the positive and negative voltages appearing at the point of contact are detected by a diode circuit. The detected positive voltage represents one coordinate in the two dimensional resistive field while the detected negative voltage represents the other coordinate.

In other preferred embodiments of the invention the two voltages may be of the same polarity, in which case they are time-synchronized with a voltage detector connected to the conductive surface so that the two distinct coordinates may be separately identified. In still another alternative embodiment of the invention, the two supply voltages may have different frequencies, in which case they are simultaneously applied to the resistive film and simultaneously detected by frequency sensitive detectors connected to the conductive surface.

In yet another preferred embodiment of the present invention, voltages are applied across opposite edges of two separate resistive films of generally rectangular configuration. The resistive films are orthogonally oriented (i.e., rotated 90° relative to one another) and mounted adjacent opposite sides of a two-sided conductive film. Conductive surfaces on the top and bottom of the film permit contact to be made when pressure is applied to the touch controlled membrane. Output voltages from the two conductive coatings represent the X and Y coordinates of the point of contact in the two dimensional resistive field.

It is therefore a primary object of the present invention to provide a touch controlled membrane device which provides a continuous range of output voltages as a function of any selected position in a multi-dimensional resistive field.

It is another important object of the present invention to provide a touch controlled membrane device which requires either one or two voltage sources for its operation.

It is still another important object of the present invention to provide a touch controlled membrane device which includes a minimum number of component parts and is simple and inexpensive to manufacture.

The novel features which are believed to be characteristic of the invention, both as to its organization and method of operation, together with further objects and advantages thereof, will be better understood from the following description and appended claims considered in connection with the accompanying drawings, in which illustrative embodiments of the invention are shown by way of example.

DETAILED DESCRIPTION OF THE PREFERRED EMBODIMENTS

Figure 1:
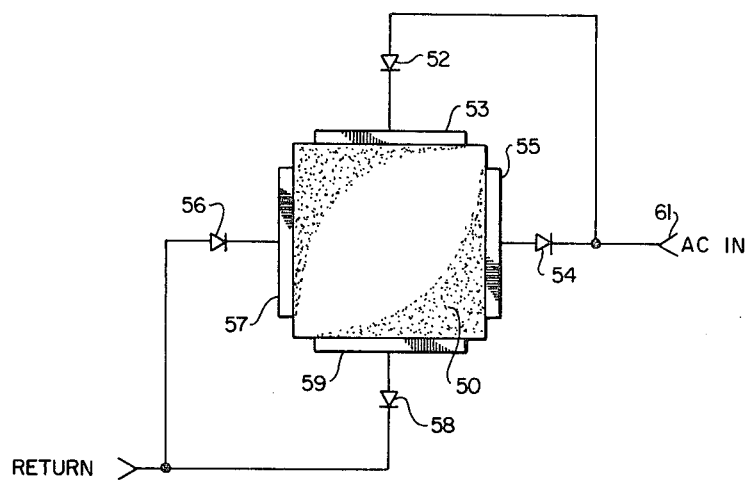
FIG. 1 is a schematic diagram of a circuit for applying supply voltage to a resistive film in accordance with a preferred embodiment of the present invention.

By reference to FIGS. 1 through 4 a first preferred embodiment of the present invention may be described. Referring specifically to FIG. 1, a resistive film 50 made of carbon or similar electrically resistive material is shown in a flat, generally square configuration. Elongated conductive terminals 53, 55, 57 and 59 are each electrically connected to one of the edges of film 50 in order to distribute voltage evenly across each edge. Specifically, terminals 53 and 59 are connected to one pair of opposing edges, and terminals 55 and 57 are connected to the other pair of opposing edges.

As schematically indicated at 61 in FIG. 1, a source of a.c. voltage is provided as the energy source for this particular embodiment. The a.c. supply voltage may have a sinusoidal wave form or it may be a squarewave voltage. The input may also be derived from two separate d.c. sources.

Two half-wave rectifier circuits are employed to cause alternate conduction of the source voltages through film 50 in substantially orthogonal directions. A first half-wave rectifier circuit includes diodes 52 and 58. The anode of diode 52 is connected to the input side of the a.c. source, while the cathode of diode 52 is connected to terminal 53 of film 50. The anode of diode 58 is connected to terminal 59 while the cathode of diode 58 is connected to the return side of the a.c. supply. The other half-wave rectifier circuit includes diodes 54 and 56. The anode of diode 54 is connected to terminal 55 while the cathode of diode 54 is connected to the input side of the a.c. source. The anode of diode 56 is connected to the return side of the a.c. source while the cathode of diode 56 is connected to terminal 57.

During positive half-cycles of the a.c. supply voltage, current flows from the a.c. source to the return path through, respectively, diode 52, terminal 53, resistive film 50, terminal 59 and diode 58. For purposes of the present description, this path will be referred to as the Y-direction along the resistive film 50. During current flow in the Y-direction a voltage gradient is established due to the resistive nature of film 50, so that the voltage in that direction decreases continuously with increasing distance from terminal 53. During negative half-cycles of the a.c. supply voltage, current flows from left to right (referred to herein as the X-direction) through film 50. Specifically, current flows from the return path to the a.c. source through, respectively, diode 56, terminal 57, resistive film 50, terminal 55 and diode 54. The magnitude of the resulting voltage increases in the negative direction with increasing distance from terminal 57. Thus, in this manner a two dimensional resistive field is established using a single resistive film.

Figure 2:
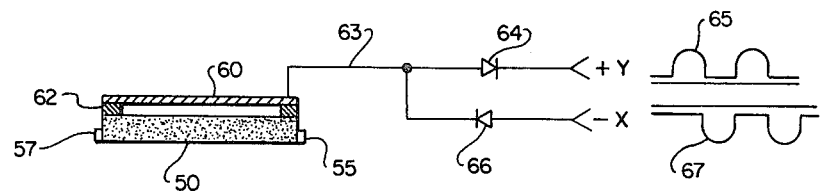
FIG. 2 is a schematic diagram of a circuit used to derive an output signal from the conductive film in accordance with the preferred embodiment of the present invention.

FIG. 2 provides an illustration of resistive film 50 spaced from a coextensive electrically conductive membrane 60 by a peripheral support frame 62. An output lead 63 is connected from conductive film 60 to the anode of an output diode 64 and the cathode of another output diode 66.

When any portion of conductive film 60 is pressed into contact with resistive film 50 (or alternatively, resistive film 50 may be flexible so as to be capable of being pressed into contact with film 60), a voltage is applied from film 50 to conductive film 60. Due to the voltage gradient across film 50, the magnitude of the voltage applied on film 60 is directly proportional to the location on the surface of film 50 which is contacted by film 60. Since the voltage from the a.c. source changes polarity and direction of travel through film 50 on each half cycle, and since the voltage magnitude in each half cycle relates to either the X or Y coordinate of contact, separate measurement of the half-cycle voltage magnitudes permits a determination of the coordinate location of contact between films 50 and 60.

Diodes 64 and 66 provide the means by which separate measurement of the half-cycle voltage magnitudes is possible. Since output diode 64 is positively polarized with respect to conductive film 60, voltage signals 65 corresponding to the Y coordinate voltage are permitted to pass therethrough. Similarly, output diode 66, being negatively polarized with respect to film 60, permits the passage of voltage signals 67 corresponding to the X coordinate voltage. Signals received from output diodes 64 and 66 are passed to detectors which may be comprised of conventional comparitor circuitry (not shown), wherein signals are produced identifying the actual location of contact on the planar surface of film 50.

Figure 3:
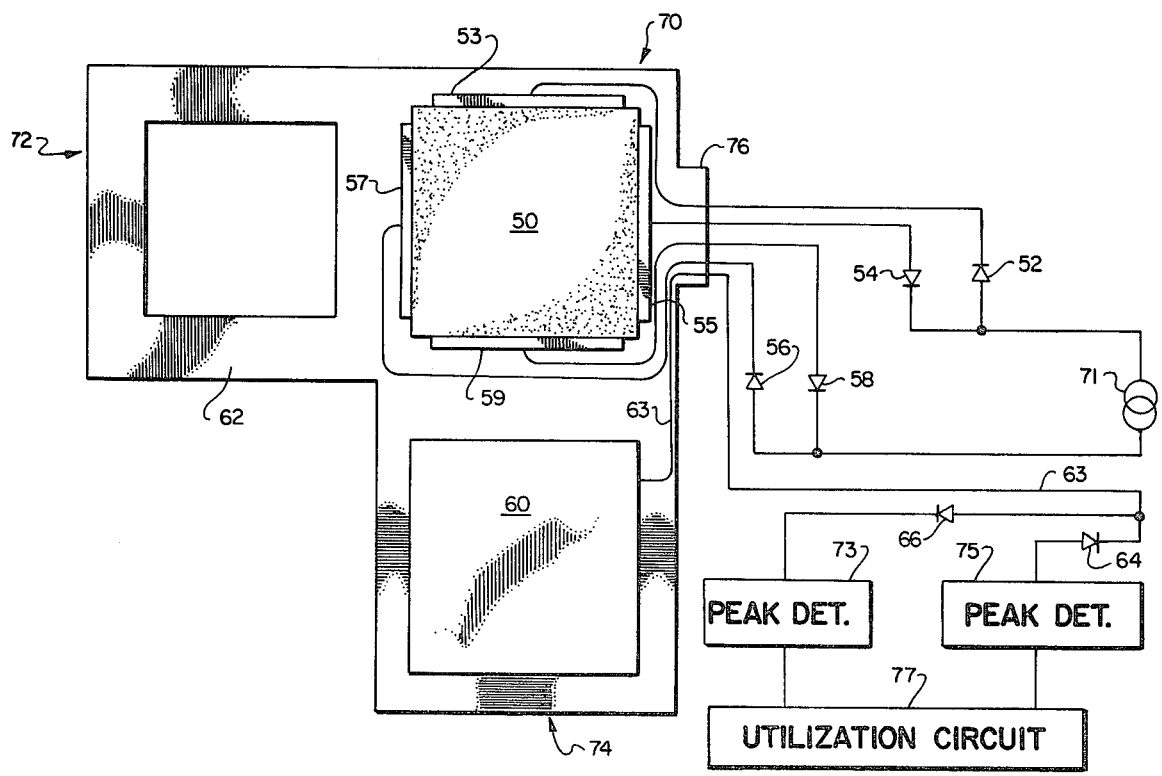
FIG. 3 is a schematic diagram of the overall membrane device and its associated circuitry, particularly illustrating one possible technique of fabricating the touch controlled membrane device.
Figure 4:
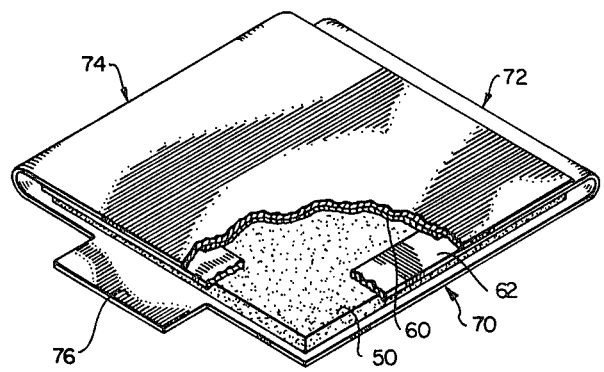
FIG. 4 is a perspective view of the device of FIG. 3 with portions broken away to better illustrate the various membrane surfaces in their folded configuration.

FIGS. 3 and 4 provide an illustration of how the device of FIGS. 1 and 2 may be manufactured. A sheet of insulative material is subdivided into three sections 70, 72 and 74 of substantially identical peripheral configuration. Section 70 shares respective common edges with sections 72 and 74. Section 70 additionally has a resistive film 50 applied centrally thereon. Terminals 53, 55, 57 and 59 are connected along the respective edges of film 50 as above described.

The insulative material in the center portion of section 72 is removed so that the remaining material forms the peripheral support frame 62. Since the edges of film 50 are set back from the edges of section 70, it is important that the width of support frame 62 be large enough to overlie a portion of each edge of film 50 when section 72 is folded along the common edge with section 70 so as to overlay section 70.

A lead wire 63 is secured to conductive film 60. Conductive film 60 is applied onto the face of section 74 of the unfolded membrane potentiometer. After section 72 has been folded onto section 70, section 74 is folded along the common edge with section 70 so as to rest on top of section 72 in contact with lead wire 63 and in substantially parallel alignment with the surface of resistive film 50.

After the folding process is completed the overlaid sections 70, 72 and 74 may be secured in the folded position as best illustrated in FIG. 4 by use of well-known securing or sealing means such as adhesive, tape, or the addition of a securing frame about the device's periphery.

By further reference to FIG. 3, it is seen that a conventional wire guide or connector 76 is provided at an exposed edge of section 70 to permit connection of the various components of the membrane potentiometer to the external circuit elements. The interrelationship of the external circuit elements is specifically illustrated in FIG. 3. Thus it is seen that the a.c. input and return leads of FIG. 1 connect respectively to the output and return ports of the a.c. power source 71. In addition, output diodes 64 and 66 are connected to respective peak detector circuits 75 and 73 which feed the detected peak voltage levels to appropriate utilization and/or display circuitry 77.

The invention described above permits a single resistive surface and a single conductive surface to be used to provide voltages which identify the X and Y coodinates of any contact point between opposed resistive and conductive films 50 and 60. This is possible because the supply voltages for each coordinate are of different polarity and are applied at different times. However, it should be noted that the different polarities and different times of voltage application are not required to achieve a working embodiment of this invention. For example, a first a.c. voltage may be applied periodically in the X coordinate direction across resistive film 50. A second a.c. voltage of the same polarity as the first may be applied in the Y coordinate direction across resistive film 50 at different times than the first voltage. Peak detection circuits connected to the X and Y voltage output from conductive film 60 are then time-synchronized with the applied voltages so as to separately detect the X and Y coordinate voltage signals and determine their respective magnitudes. Alternatively, the two supply voltages may have different frequencies, in which case they can be applied simultaneously. In this case the X and Y output circuits would include frequency detection or selection filtering circuits so that the coordinate voltages could be separately detected.

Also, two separate d.c. sources can be used to apply the voltage gradients in the X and Y directions. The key feature, then, for this embodiment is that the two applied voltages are different in at least one parameter (i.e., polarity, time or frequency) so as to permit detection of both from a common conductor.

Figure 5:
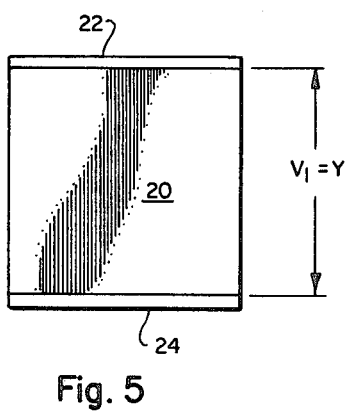
FIG. 5 is a plan view of a first resistive film employed in a touch controlled membrane device of a second preferred embodiment of the present invention.
Figure 6:
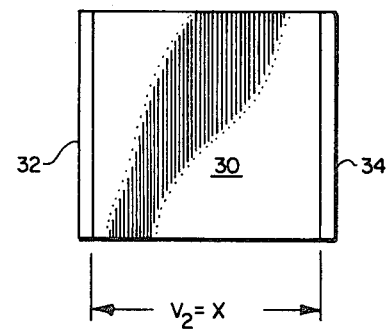
FIG. 6 is a plan view of a second resistive film employed in the membrane device of the second preferred embodiment of the present invention.
Figure 7:
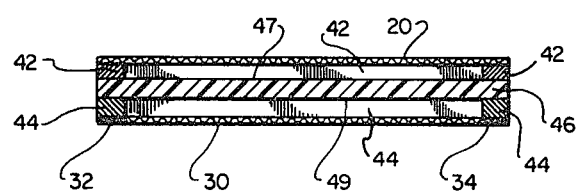
FIG. 7 is a side sectional view of the second preferred embodiment of the invention, employing the resistive films of FIGS. 4 and 5.

Another embodiment of the present invention is illustrated in FIGS. 5, 6, and 7. In this embodiment a flexible, electrically resistive film 20, made of carbon or the like, is provided with two electrically conductive terminals, 22 and 24, which are secured along the lengths of opposite film edges. A substantially identical flexible, electrically resistive film 30 is also connected along each of two opposing edges to electrically conductive terminals 32 and 34. Terminals 32 and 34 are positioned on film 30 so as to be orthogonally oriented relative to the terminals 22 and 24 of film 20 when the face of film 20 is positioned parallel to and coextensive with that of film 30. The orthogonally oriented resistive films 20 and 30 together define the two dimensional resistive field.

A two-sided conductive film 46 (see FIG. 7) is comprised of an electrically insulative material such as rubber or plastic. A material such as silver or copper is applied to each of the faces of film 46 so as to define an electrically conductive top surface 47 and an electrically conductive bottom surface 49. An insulative spacer 44 is secured between bottom conductive surface 49 and film 30 so as to extend around the entire bottom perimeter of the conductive film 46. Spacer 44 maintains film 30 in closely spaced parallel relation to conductive bottom surface 49. Likewise, an insulative spacer shown at 42 is secured between top conductive surface 47 and film 20 so as to extend around the entire top perimeter of the conductive film 46.

In operation, a first voltage $V_1$ is applied across resistive film 20 between terminals 22 and 24, and a second voltage $V_2$ is applied across resistive film 30 between terminals 32 and 34. The direction of current flow, and hence the direction of the voltage gradient in film 20, is substantially orthogonally oriented with respect to the current flow and voltage gradient in film 30. Therefore, if sufficient pressure is applied to cause films 20 and 30 to contact their opposed conductive surfaces 47 and 49, then voltages which correspond to the X and Y coordinates of the contact location will be transmitted to those conductive surfaces. Thus, for example, if the voltage $V_1$ applied between terminals 22 and 24 across film 20 is defined as the Y dimension, and the voltage $V_2$ applied between terminals 32 and 34 across film 30 is defined as the X dimension, then the voltage measured at conductor 47 represents the Y coordinate of the contact location, while the voltage measured at conductor 49 represents the corresponding X coordinate. The applied voltages $V_1$ and $V_2$ may be either a.c. or d.c.; they can be simultaneously or separately applied; and they may have the same or different waveforms since the output voltage for each coordinate is derived from a totally separate conductive surface.

Although the above-described embodiments specifically disclose touch controlled membrane devices which may be used for identifying particular locations on a two dimensional field, the invention described and claimed herein is equally useful for making such identifications in fields having three or more dimensions. For example, by constructing the device disclosed in FIGS. 1 through 4 in a configuration as illustrated in FIGS. 5 through 7, a contact location on four different planar fields can be identified. More specifically, this is accomplished by securing terminals such as those defined by 53, 55, 57 and 59 in FIG. 1, to the edges of resistive film 20 illustrated in FIGS. 5 through 7. Identical terminals are also secured to the edges of resistive film 30 of FIGS. 5 through 7. To each of the terminals secured to film 20 and to conductive surface 47 is connected diode circuitry identical to that illustrated in FIGS. 1 through 4. Likewise, identical diode circuitry is connected to film 30 and conductive surface 49. An a.c. voltage is applied to the inputs of the circuit associated with film 20, and a separate a.c. voltage is applied to the inputs of the circuit associated with film 30. Upon contacting films 20 and 30 with conductive surfaces 47 and 49, respectively, four separate coordinate related output voltage signals are produced in the manner previously described.

The above-described device or the device illustrated in FIGS. 4 through 6 may be further altered so as to produce multiple coordinate outputs by stacking multiples of these devices along parallel surfaces separated by insulators. Each of the stacked devices includes separate circuitry identical to that used for operation of the individual device by itself. Upon applying sufficient pressure to cause contact of all parallel surfaces, any number of separate coordinate related output voltage signals are produced. Such stacking of devices may be repeated to further increase the number of dimensional signals which are available.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A touch controlled membrane device for providing output signals representative of any dual coordinate position resulting from an applied pressure in a two dimensional field, said device comprising:

a first member having an electrically resistive surface;

a second member having an electrically resistive surface;

a third member having first and second conductive surfaces;

means for supporting said first and second members in close spaced and substantially coextensive relationship to said third member such that contact between the first conductive surface and first resistive surface and between the second conductive surface and second resistive surface will occur in response to application of localized pressure to at least one of said first and second members at any point in said field;

means for applying a first voltage across said first member;

a means for applying a second voltage across said second member in a direction substantially orthogonal to that of the first voltage;

a first output circuit for providing a first output voltage corresponding to the point of contact between said first resistive and conductive surfaces; and a second output circuit for providing a second output voltage corresponding to the point of contact between said second resistive and conductive surfaces.

2. A device as defined in claim 1 wherein said first and second members are flexible so as to be responsive to the said applied pressure.

3. A touch controlled membrane for defining any dual coordinate position in a two dimensional field producted by any point of applied pressure in said two dimensional field, the device comprising:

a first resistive member for establishing a continuous voltage gradient in a first axis direction in response to application of a first voltage thereto;

a second resistive member for establishing a continuous voltage gradient in a second axis direction in response to application of a second voltage thereto;

means for applying said first voltage to said first resistive member;

means for applying said second voltage to said second resistive member; and conductive means for contacting said first and second resistive members at said point of applied pressure so as to provide output voltages corresponding to the voltages appearing at the points of contact of said conductive means with said first and second resistive members.

4. A device as defined in claim 3 wherein said conductive means comprises first and second conductive surfaces positioned substantially coextensive with and in close spaced relation to said first and second resistive members, respectively.

5. A device as defined in claim 4 wherein said conductive means comprises an insulative film having opposite surfaces which provide said first and second conductive surfaces.

6. A device as defined in claim 3 wherein said first and second members comprise resistive films.

7. A device for defining any dual coordinate position produced by an applied pressure in a two dimensional resistive field, said device comprising:

a first member having a resistive surface;

a second member having a first conductive surface mounted in closely spaced, substantially coextensive relationship with the resistive surface of said first member;

a third member having a resistive surface;

a second conductive surface on said second member mounted in closely spaced, substantially coextensive relationship with the resistive surface of said third member;

a first pair of terminals secured to the resistive surface of said first member and responsive to application of voltage thereto for establishing a voltage gradient in a first axis direction;

a second pair of terminals secured to the resistive surface of said third member and responsive to application of voltage thereto for establishing a voltage gradient in a second axis direction which is substantially orthogonal with respect to said first direction; and means for outputting the voltage applied to each said conductive surface during contact with the respective resistive surfaces.

8. A touch controlled membrane device for defining any dual coordinate position in a two dimensional resistive field produced by an applied pressure, the device comprising:

a first member having a first electrically resistive surface for establishing a continuous voltage gradient in a first direction in said two dimensional resistive field in response to application of a first voltage thereto;

a second member having a second electrically resistive surface for establishing a continuous voltage gradient in a second direction in said two dimensional resistive field in response to application of a second voltage thereto;

means for providing a power source for generating said first and second voltages applied to said resistive field; and a third member having first and second conductive surfaces positioned substantially coextensive with and in close spaced relation to said first and second resistive surfaces, respectively, for providing first and second output voltages corresponding to any point of contact on said resistive field resulting from the applied pressure.

9. A device as defined in claim 8 wherein said third member comprises an insulative film having opposite sides thereof which provide said first and second conductive surfaces.

10. A device as defined in claim 8 wherein said first and second members comprise resistive films.

* * * * *

UNITED STATES PATENT AND TRADEMARK OFFICE
CERTIFICATE OF CORRECTION

PATENT NO. : 4,444,998
DATED : April 24, 1984
INVENTOR(S) : V. Dean House

It is certified that error appears in the above-identified patent and that said Letters Patent is hereby corrected as shown below:

Column 1, line 49, "example, see U.S." should be --example, U.S.--
Column 6, line 30, "coodinates" should be --coordinates--
Column 8, lines 58-59, "producted" should be --produced--

Signed and Sealed this

Twenty-third Day of October 1984

[SEAL]

Attest:

GERALD J. MOSSINGHOFF

*Attesting Officer*     *Commissioner of Patents and Trademarks*